(12) United States Patent
Hopkins

(10) Patent No.: US 9,221,598 B2
(45) Date of Patent: Dec. 29, 2015

(54) PORTABLE CONTAINMENT SYSTEM FOR HAZARDOUS OR OTHER MATERIALS

(71) Applicant: TitanLiner, Inc., Midland, TX (US)

(72) Inventor: Joshua D. Hopkins, Midland, TX (US)

(73) Assignee: TitanLiner, Inc., Midland, TX (US)

( * ) Notice: Subject to any disclaimer, the term of this patent is extended or adjusted under 35 U.S.C. 154(b) by 0 days.

(21) Appl. No.: 14/284,641

(22) Filed: May 22, 2014

(65) Prior Publication Data
US 2014/0251990 A1   Sep. 11, 2014

Related U.S. Application Data

(63) Continuation of application No. 14/223,425, filed on Mar. 24, 2014, which is a continuation-in-part of application No. 13/616,602, filed on Sep. 14, 2012.

(60) Provisional application No. 61/535,760, filed on Sep. 16, 2011.

(51) Int. Cl.
*B29C 65/52* (2006.01)
*B29C 65/54* (2006.01)
(Continued)

(52) U.S. Cl.
CPC ............... *B65D 88/16* (2013.01); *B65D 90/24* (2013.01); *F16N 31/006* (2013.01)

(58) Field of Classification Search
CPC ........ B65D 37/00; B65D 61/00; B65D 88/16; B65D 90/24; F16N 31/006; B08B 17/00; F01B 19/006; B32B 27/00; B32B 27/02; B32B 27/04; B32B 27/12; B32B 37/142; C09J 4/00; C09J 5/02; C09J 175/02; B29C 39/10; B29C 70/04; B29C 70/086; C08J 5/06; C08J 5/12; C08J 5/124

USPC ............... 156/278, 280, 307.1, 307.3, 307.5; 220/9.1, 9.4, 573, 605
See application file for complete search history.

(56) References Cited

U.S. PATENT DOCUMENTS

| | | |
|---|---|---|
| 5,090,588 A | 2/1992 | Van Romer et al. |
| 5,464,492 A | 11/1995 | Gregory et al. |

(Continued)

FOREIGN PATENT DOCUMENTS

WO    WO 02/083493 A1    10/2002

OTHER PUBLICATIONS

International Search Report dated Jan. 22, 2013 in connection with International Patent Application No. PCT/US2012/055342, 4 pages.
Written Opinion of International Searching Authority dated Jan. 22, 2013 in connection with International Patent Application No. PCT/US2012/055342, 6 pages.

(Continued)

*Primary Examiner* — Sing P Chan

(57) ABSTRACT

A method includes wrapping one or more pieces of fabric around at least one piece of shape memory material. The method also includes attaching outer edges of the one or more pieces of fabric to other portions of the one or more pieces of fabric. The method further includes depositing liquid-impervious material onto the one or more pieces of fabric to form free-standing flexible walls and a floor of a containment structure. The floor is formed seamlessly with the walls. The wrapping could include attaching a bottom of the at least one piece of shape memory material to the one or more pieces of fabric at locations spaced apart from the outer edges of the one or more pieces of fabric. The wrapping could also include attaching sides of the at least one piece of shape memory material to the one or more pieces of fabric.

20 Claims, 15 Drawing Sheets

(51) Int. Cl.
*B32B 37/12* (2006.01)
*B32B 38/08* (2006.01)
*B32B 43/00* (2006.01)
*C08J 5/00* (2006.01)
*C09J 5/00* (2006.01)
*B65D 88/16* (2006.01)
*F16N 31/00* (2006.01)
*B65D 90/24* (2006.01)

(56) References Cited

U.S. PATENT DOCUMENTS

| | | | |
|---|---|---|---|
| 5,567,259 A | | 10/1996 | Gregory et al. |
| 5,762,233 A | * | 6/1998 | Van Romer ............... 220/573 |
| 5,800,091 A | | 9/1998 | Van Romer |
| 5,968,814 A | * | 10/1999 | Blake et al. ............... 435/281 |
| 6,019,243 A | * | 2/2000 | Marino ...................... 220/573 |
| 6,092,686 A | | 7/2000 | Shaw et al. |
| 6,880,720 B2 | | 4/2005 | Van Romer |
| 7,168,588 B2 | | 1/2007 | Van Romer |
| 7,452,433 B2 | | 11/2008 | Shin et al. |
| 7,736,097 B2 | | 6/2010 | D'Andreta et al. |
| 8,191,722 B1 | * | 6/2012 | Town .......................... 220/1.6 |
| 8,740,006 B2 | * | 6/2014 | Matson ....................... 220/571 |
| 2003/0053865 A1 | * | 3/2003 | Ianniello et al. ......... 405/129.1 |
| 2008/0102242 A1 | | 5/2008 | Hamdar et al. |
| 2008/0223857 A1 | | 9/2008 | Palley et al. |
| 2010/0140262 A1 | | 6/2010 | Whitener |
| 2012/0189810 A1 | | 7/2012 | Whitener |

OTHER PUBLICATIONS

"Rain for Rent—SpillGuard Portable Berms" printed from internet Apr. 3, 2012; http://www.rainforrent.com/products/Spillguards/spillguardspro . . . 1 page.

"Portable Fol-Da-Tank" printed from internet Apr. 3, 2012; Secondary Spill Containment Berms; http://www.fol-da-tank.com/page/secondary_containment.aspx 9 pages.

Interstate Products, Inc.; Spill Containment Berms; printed from internet Apr. 3, 2012; http://www.interstateproducts.com/spill_berms.htm; 3 pages.

Interstate Products, Inc.; Collapsible Wall Spill Berm; printed from internet Apr. 3, 2012; http://www.interstateproducts.com/collapsible_wall_spill_berm.htm; 2 pages.

Interstate Products, Inc.; Flex Wall Spill Berm; printed from internet Apr. 3, 2012; http://www.interstateproducts.com/flex_wall_spill_berms.htm; 2 pages.

Versa-Berm; Versatech Products Inc.; printed from internet Apr. 3, 2012; http://versatech.com/versa-berm.html; 4 pages.

"Falcon Equipment Pad, High-tech wellsite protection", Falcon Technologies and Services, Inc., 2012, 2 pages.

All Non-patent literatures are located in parent U.S. Appl. No. 13/616,602.

U.S. Non-Final Office Action dated Jun. 4, 2014 in connection with U.S. Appl. No. 13/616,602, 7 pages.

U.S. Non-Final Office Action dated Apr. 9, 2015 in connection with U.S. Appl. No. 14/223,425, 14 pages.

* cited by examiner

PORTABLE CONTAINMENT SYSTEM FOR HAZARDOUS OR OTHER MATERIALS

CROSS-REFERENCE TO RELATED APPLICATION AND PRIORITY CLAIM

This application is a continuation of U.S. patent application Ser. No. 14/223,425 filed on Mar. 24, 2014, which is a continuation-in-part of U.S. patent application Ser. No. 13/616,602 filed on Sep. 14, 2012, which claims priority under 35 U.S.C. §119(e) to U.S. Provisional Patent Application No. 61/535,760 filed on Sep. 16, 2011. All of these patent applications are hereby incorporated by reference.

TECHNICAL FIELD

This disclosure is generally directed to containment systems. More specifically, this disclosure is directed to a portable containment system for hazardous or other materials.

BACKGROUND

Often times, it is necessary or desirable to prevent material from being released or absorbed into the ground. For example, the release of hazardous or other materials into the ground could contaminate ground water or cause other problems. As a particular example, hazardous or other materials are often stored in tanks. Any spills or leaks of materials from the tanks could lead to contamination as well as civil or regulatory fines.

SUMMARY

This disclosure provides a portable containment system for hazardous or other materials.

In a first embodiment, a method includes wrapping one or more pieces of fabric around at least one piece of shape memory material. The method also includes attaching outer edges of the one or more pieces of fabric to other portions of the one or more pieces of fabric. The method further includes depositing liquid-impervious material onto the one or more pieces of fabric to form free-standing flexible walls and a floor of a containment structure, where the floor is formed seamlessly with the walls.

In a second embodiment, an apparatus includes a containment structure having a floor and free-standing flexible walls. The floor includes one or more pieces of fabric, and the free-standing flexible walls include at least one piece of shape memory material. The one or more pieces of fabric wrap around the at least one piece of shape memory material. Outer edges of the one or more pieces of fabric are attached to other portions of the one or more pieces of fabric. Liquid-impervious material is located on the one or more pieces of fabric. The floor is seamless with the free-standing flexible walls.

In a third embodiment, a method includes wrapping one or more pieces of fabric around at least one piece of shape memory material. The wrapping includes attaching a bottom of the at least one piece of shape memory material to the one or more pieces of fabric using liquid-impervious material at locations spaced apart from outer edges of the one or more pieces of fabric. The wrapping also includes attaching sides of the at least one piece of shape memory material to the one or more pieces of fabric using liquid-impervious material. The method also includes attaching outer edges of the one or more pieces of fabric to other portions of the one or more pieces of fabric using liquid-impervious material. The method further includes depositing liquid-impervious material onto the one or more pieces of fabric to form free-standing flexible walls and a floor of a containment structure, where the floor is formed seamlessly with the walls. In addition, the method includes depositing liquid-impervious material onto a second side of the one or more pieces of fabric to protect an underside of the containment structure.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 17, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
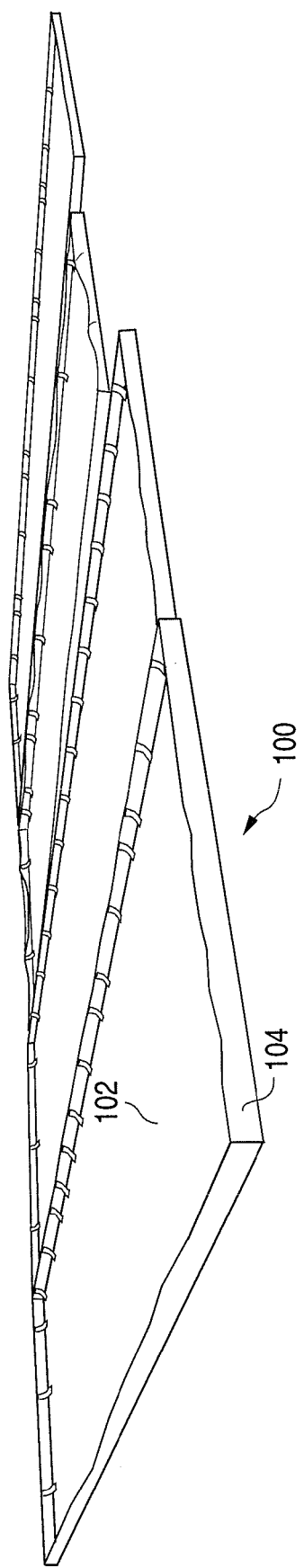
FIGS. 1 through 6 illustrate a first example portable containment system in accordance with this disclosure.
Figure 2:
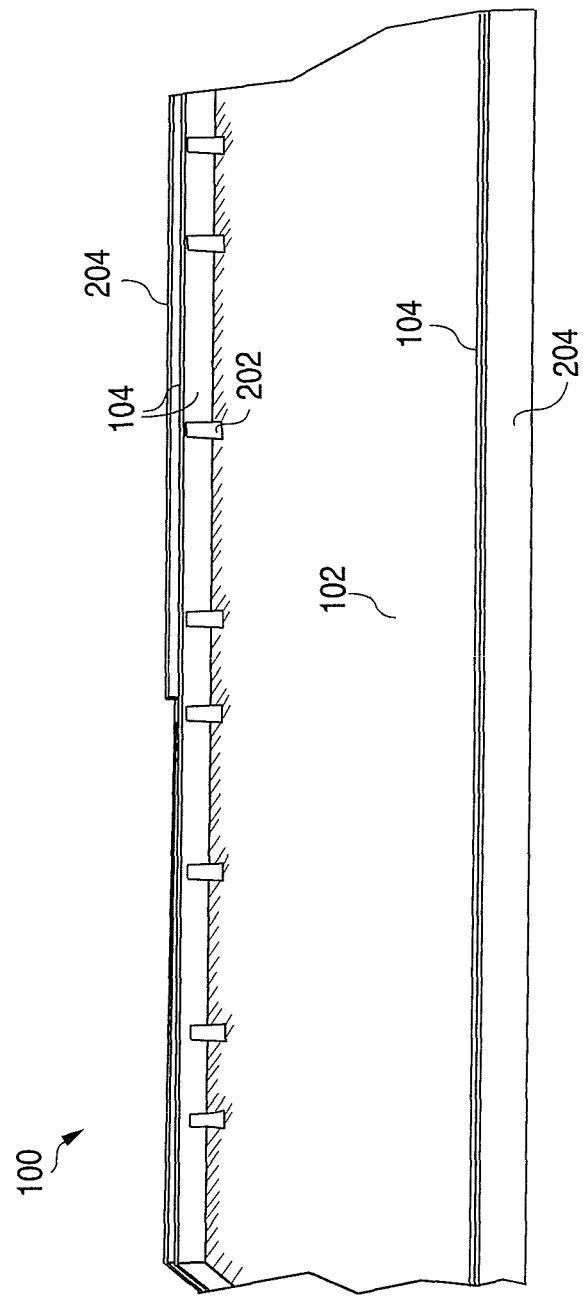
Figure 3:
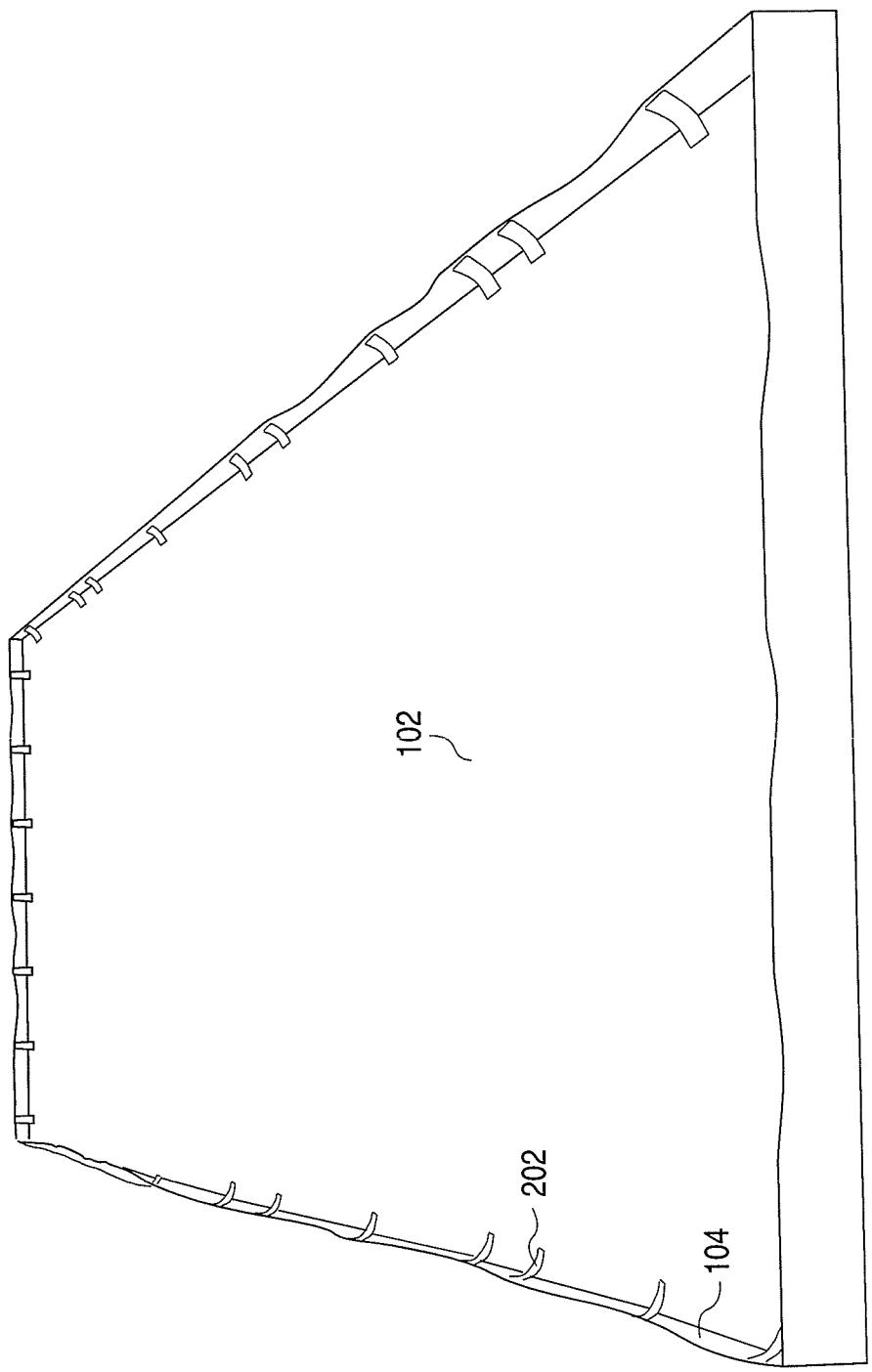

FIGS. 1 through 6 illustrate a first example portable containment system 100 in accordance with this disclosure. FIG. 1 illustrates multiple instances of the portable containment system 100. The containment system 100 includes a bottom portion or floor 102 and free-standing walls 104. The containment system 100 operates to contain and hold material between the walls 104 and over the floor 102, thereby helping to prevent the material from being absorbed into the ground. In some embodiments, the containment system 100 is a seamless structure formed from polyurea and felt. However, the containment system 100 could be formed from any other suitable materials. Also, the containment system 100 can be used to hold and prevent release of any hazardous and non-hazardous material(s).

An example containment system 100 is shown in greater detail in FIGS. 2 through 6. For example, in FIGS. 2 and 3, the containment system 100 is shown with its floor 102 and free-standing walls 104. Multiple supports 202 attached to the walls 104 and floor 102 help to support the walls 104 of the containment system 100. For example, if liquid or other material leaks into the containment system 100, the supports 202 can help retain the walls 104 in an upright position to hold the material within the containment system 100. The supports 202 include any suitable structures for supporting the walls 104, such as flexible supports.

One or more molds 204 are used to help form the containment system 100. As described in more detail below, the molds 204 can be used to help form the walls 104 of the containment system 100. Each mold 204 includes any suitable structure for helping to form at least part of the containment system 100. For example, each mold 204 could represent an L-shaped wooden mold that is six inches tall and four inches wide. Other types of molds could also be used, such as carbon fiber molds. Moreover, molds having other sizes and shapes, such as rounded corners, could be used.

Figure 4:
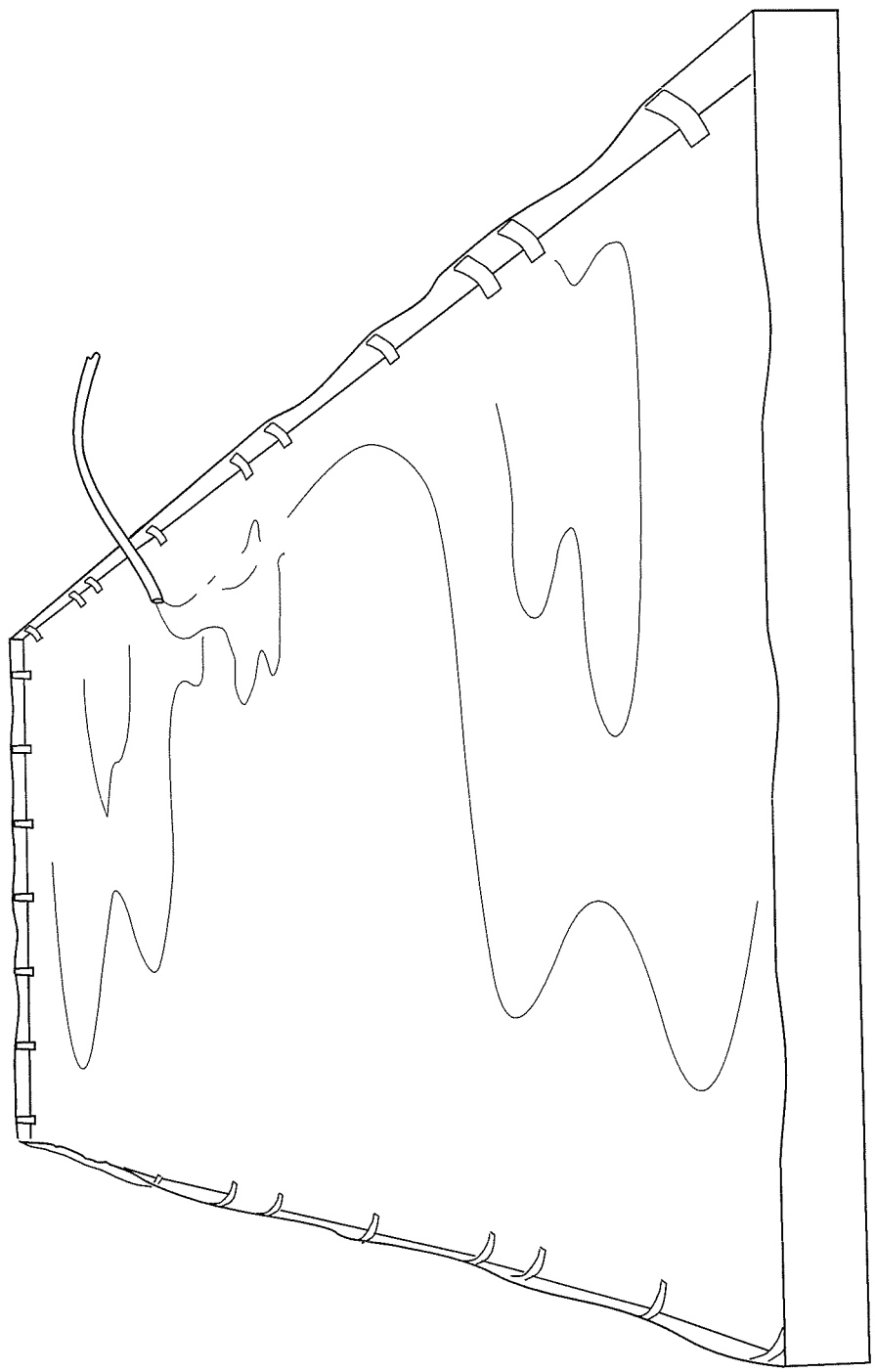
Figure 5:
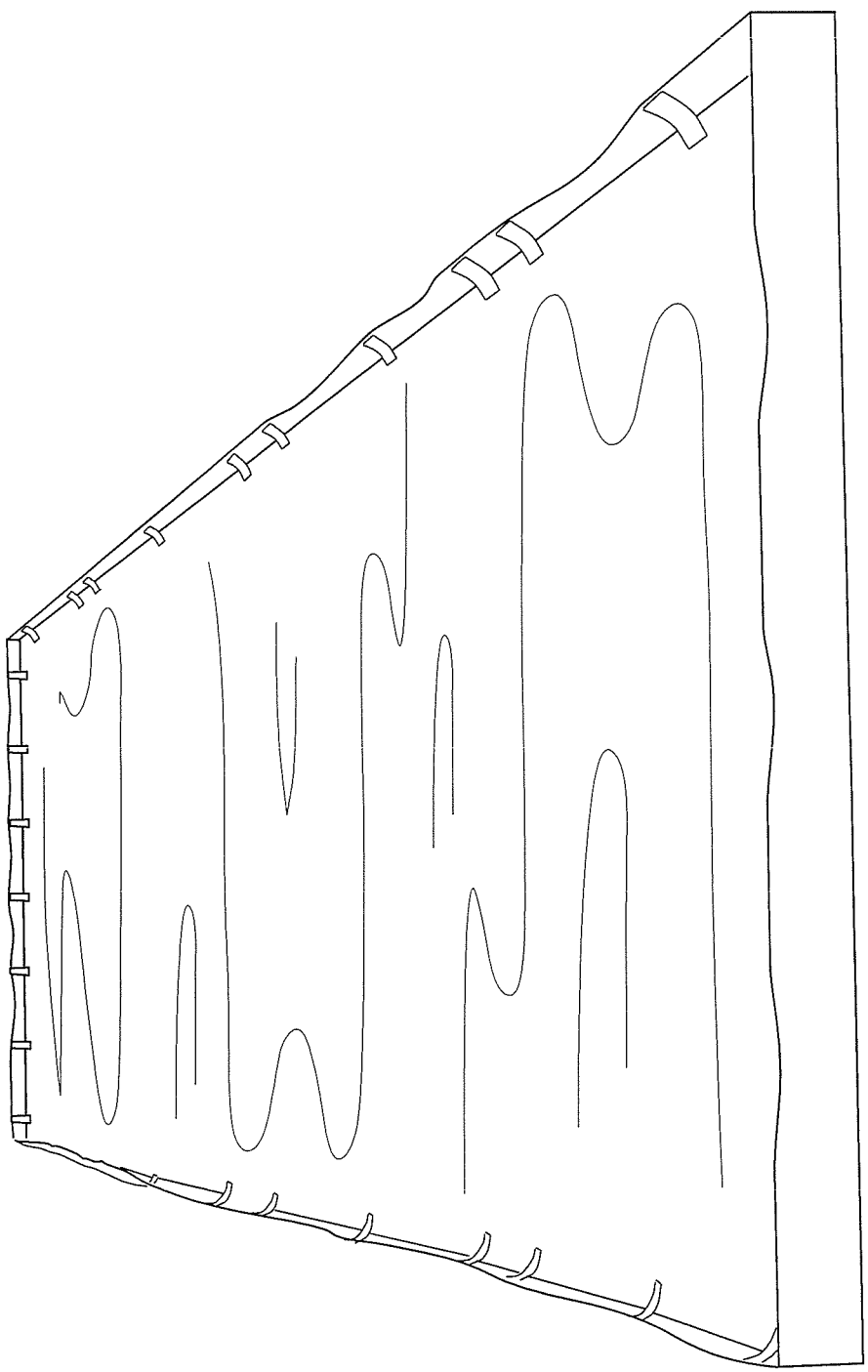

As shown in FIGS. 4 and 5, once the containment system 100 is formed, the molds 204 can be removed, and material can be placed within the containment system 100. In this case, water is being placed into the containment system 100 for testing purposes. The supports 202 help to keep the walls 104 upright as the containment system 100 is being filled with water.

Figure 6:
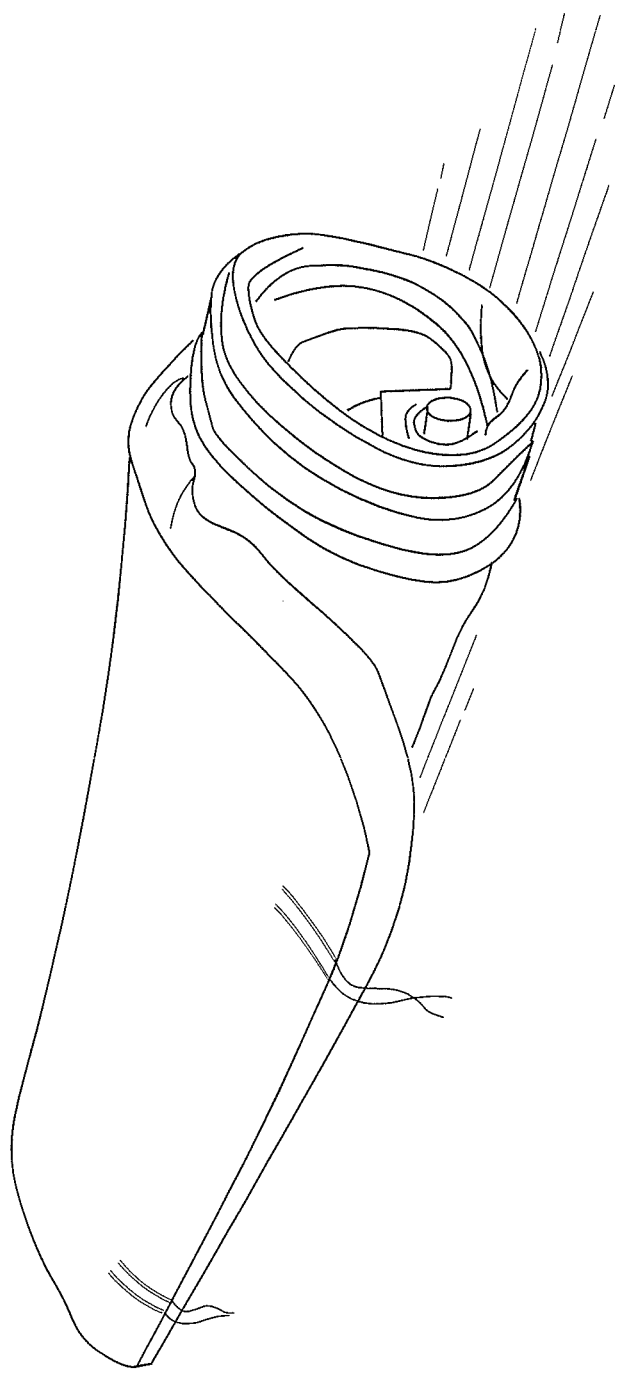

The containment system 100 here is flexible and can be rolled or otherwise placed into a suitable form for transport. An example of this is shown in FIG. 6, where the containment system 100 has been rolled for transport. Once at its intended destination, the containment system 100 can be placed on the ground and unrolled or otherwise placed into a suitable form for use, and equipment (such as one or more storage tanks) can be placed on the containment system 100. When the equipment is being placed onto the containment system 100, people or machinery can be used to drag or carry the equipment onto the containment system 100. The walls 104 of the containment system 100 can flex or be pressed down during this time, and the walls 104 may return substantially to their pre-flexed shape (although some deformation of a wall 104 is permissible). This helps to facilitate easier placement of the equipment on the containment system 100.

Note that the containment system 100 here does not require the use of metallic or other solid supports to hold the walls 104 of the containment system 100 upright. Among other things, this can enable simpler transport and use of the containment system 100. For instance, the containment system 100 could be easily rolled into the form shown in FIG. 6 without requiring metallic or other solid supports to first be removed from the containment system 100. Also, the containment system 100 could be easily unrolled into the form shown in FIG. 1 for use without requiring metallic or other solid supports to first be inserted into the containment system 100.

Although FIGS. 1 through 6 illustrate a first example of a portable containment system 100, various changes may be made to FIGS. 1 through 6. For example, the containment system 100 could have any suitable size, shape, and dimensions. As particular examples, the containment system 100 could be of virtually any size as long as there is enough space to create walls for containing material meant to be contained. Also, the shape could be typically square or rectangular, although circular or other shapes could also be used. Further, the walls 104 could have any suitable height(s), such as six inches. Note that non-uniform heights are also possible. In addition, while the use of certain materials (such as polyurea and felt) is described here, any other suitable materials can be used to form the containment system 100. For instance, any suitable textiles or other fabrics could be used in the containment system 100 and covered with polyurea or other liquid-impervious material(s).

Figure 7:
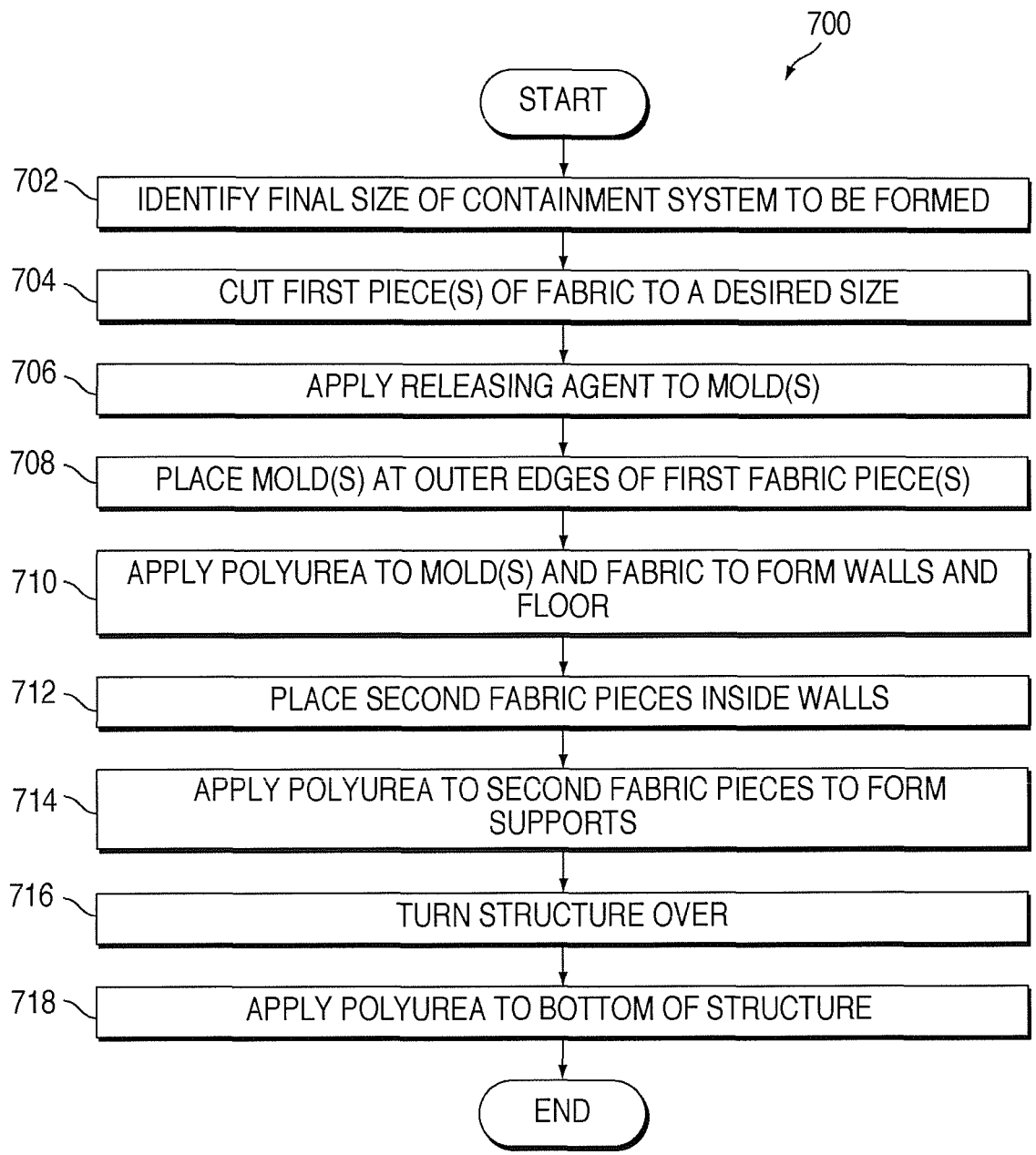
FIG. 7 illustrates an example method for forming the portable containment system of FIGS. 1 through 6 according to this disclosure.

FIG. 7 illustrates an example method 700 for forming the portable containment system of FIGS. 1 through 6 according to this disclosure. As shown in FIG. 7, a desired final size of the containment system is identified at step 702. One or more first pieces of felt or other fabric are cut to a desired size at step 704. Each first fabric piece could have any suitable size and shape, such as a rectangle four feet by twelve feet. One or multiple first pieces of fabric could be used here.

A releasing agent is applied to one or more molds at step 706. The releasing agent could represent any suitable material(s) to help prevent bonding of the containment system 100 to the mold(s) 204, such as a polyurea releasing agent. The molds are placed along outer edges of the first fabric piece(s) at step 708. The molds define where the walls 104 are being formed and can be placed so that the walls 104 define a containment system 100 having the desired final shape. If the molds 204 are L-shaped, this step could include placing outer edges of the first fabric pieces on the bottom portions of the molds 204.

Polyurea is applied to the mold(s) and fabric and cured to form the walls and floor of the containment system at step 710. This could include, for example, spraying polyurea onto the molds 204 and first fabric pieces and allowing the polyurea to cure. Any suitable amount of polyurea can be applied to the walls 104 and floor 102 of the containment system 100.

To form supports for the walls, second felt or other fabric pieces are placed inside the walls of the containment system at step 712. This could include, for example, cutting pieces of fabric and placing the fabric pieces spaced apart along the inner walls 104 of the containment structure. In particular embodiments, the second fabric pieces can be about two inches by eight inches, and the second fabric pieces can be placed about 3.5 feet apart. Note that any other suitable uniform or non-uniform sizes and spacings can be used. Polyurea is applied to the second fabric pieces to form the supports at step 714.

The containment structure is turned over at step 716, and polyurea is applied to the bottom of the structure at step 718. The polyurea used here could represent a light application of polyurea meant to protect the underside of the structure. Once completed, the containment system can be used in any suitable manner.

Although FIG. 7 illustrates one example of a method 700 for forming the portable containment system 100 of FIGS. 1 through 6, various changes may be made to FIG. 7. For example, while shown as a series of steps, various steps in FIG. 7 could overlap, occur in parallel, or occur in a different order. Also, while the use of certain materials (such as polyurea and felt) is described here, any other suitable materials can be used to form the containment system. In addition, note that spraying represents one way of depositing a liquid-impervious material onto a structure and that other deposition techniques could be used.

Figure 8:
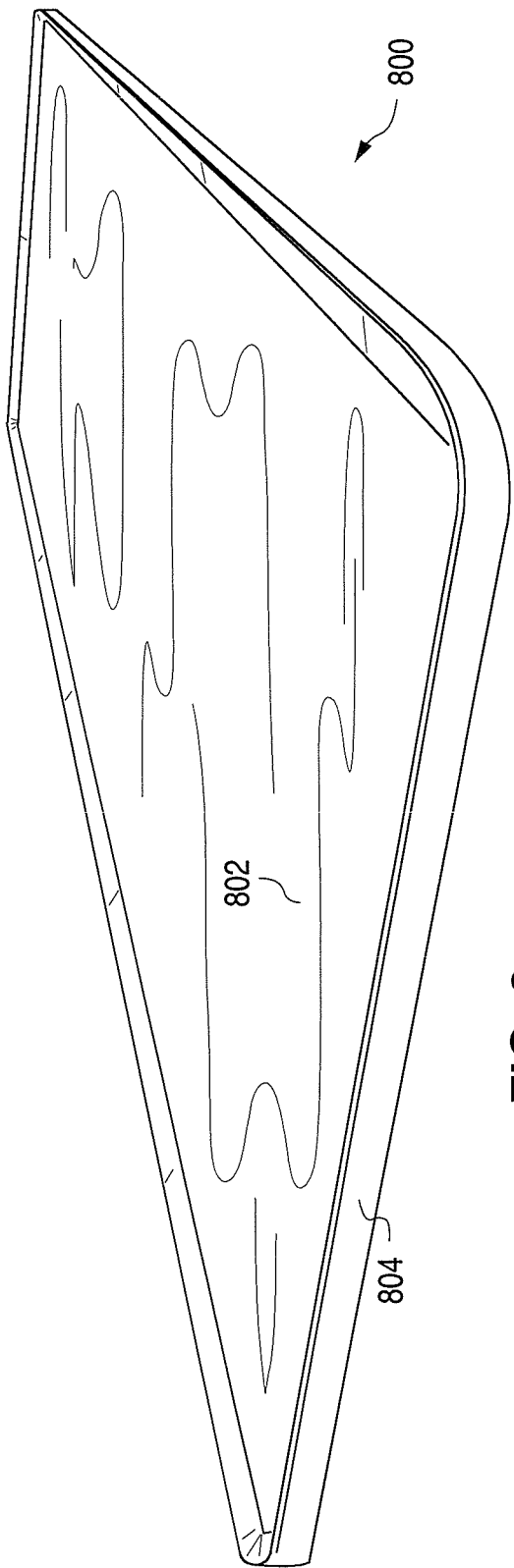
FIGS. 8 through 10 illustrate a second example portable containment system in accordance with this disclosure.
Figure 9:
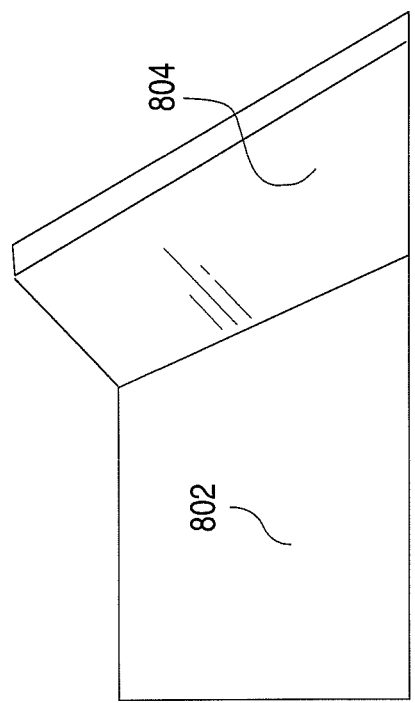
Figure 10:
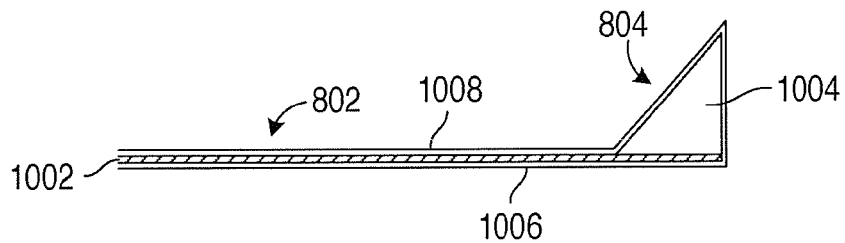

FIGS. 8 through 10 illustrate a second example portable containment system 800 in accordance with this disclosure. FIG. 8 illustrates multiple instances of the portable containment system 800. The containment system 800 includes a bottom portion or floor 802 and free-standing walls 804. The containment system 800 operates to contain and hold material between the walls 804 and over the floor 802, thereby helping to prevent the material from being absorbed into the ground. In some embodiments, the containment system 800 is a seamless structure formed from polyurea, felt, and memory foam. However, the containment system 800 could be formed from any other suitable materials. Also, the containment system 800 can be used to hold and prevent release of any hazardous and nonhazardous material(s).

A portion of the containment system 800 is shown in greater detail in FIG. 9 and in cross-section in FIG. 10. In FIG. 9, the containment system 800 is shown with its floor 802 and a free-standing wall 804. The wall 804 here is generally triangular in shape, although the wall 804 could have any other desired shape(s). If liquid or other material leaks into the containment system 800, the walls 804 remain in an upright position to hold the material within the containment system 800. The walls 804 can be formed using memory foam material or other type of shape memory material(s), which allows the walls 804 to be deformed during use.

As shown in FIG. 10, the wall 804 of the containment system 800 could be formed using felt 1002 and memory foam material 1004. The felt 1002 and memory foam material 1004 can be covered by layers 1006-1008 of polyurea to create a liquid-impervious structure. Once again, note that the memory foam material 1004 could have any other desired shape, and any other material(s) could be used in place of the felt 1002.

The containment system 800 here is flexible and can be rolled or otherwise placed into a suitable form for transport (similar to that shown in FIG. 6). Once at its intended destination, the containment system 800 can be placed on the ground and unrolled or otherwise placed into a suitable form for use, and equipment (such as one or more storage tanks) can be placed on the containment system 800. When the equipment is being placed onto the containment system 800, people or machinery can be used to drag or carry the equipment onto the containment system 800. The walls 804 of the containment system 800 can be depressed, and the walls 804 may return substantially to their pre-depressed shape (although some deformation of a wall 804 is permissible). This helps to facilitate easier placement of the equipment on the containment system 800.

Note that the containment system 800 here does not require the use of metallic or other solid supports to hold the walls 804 of the containment system 800 upright. Among other things, this can enable simpler transport and use of the containment system 800. For instance, the containment system 800 could be easily rolled into a form similar to that shown in FIG. 6 without requiring metallic or other solid supports to first be removed from the containment system 800. Also, the containment system 800 could be easily unrolled into the form shown in FIG. 8 for use without requiring metallic or other solid supports to first be inserted into the containment system 800.

Although FIGS. 8 through 10 illustrate a second example of a portable containment system 800, various changes may be made to FIGS. 8 through 10. For example, the containment system 800 could have any suitable size, shape, and dimensions. As particular examples, the containment system 800 could be of virtually any size as long as there is enough space to create walls for containing material meant to be contained. Also, the shape could be typically square or rectangular, although circular or other shapes could also be used. Further, the walls 804 could have any suitable height(s), and non-uniform heights are also possible. In addition, while the use of certain materials (such as polyurea, felt, and memory foam) is described here, any other suitable materials can be used to form the containment system 800. For instance, any suitable textiles or other fabrics could be used in the containment system 800 and covered with polyurea or other liquid-impervious material(s). Moreover, any suitable shape-memory material(s) could be used in the walls 804 of the containment system 800.

Figure 11:
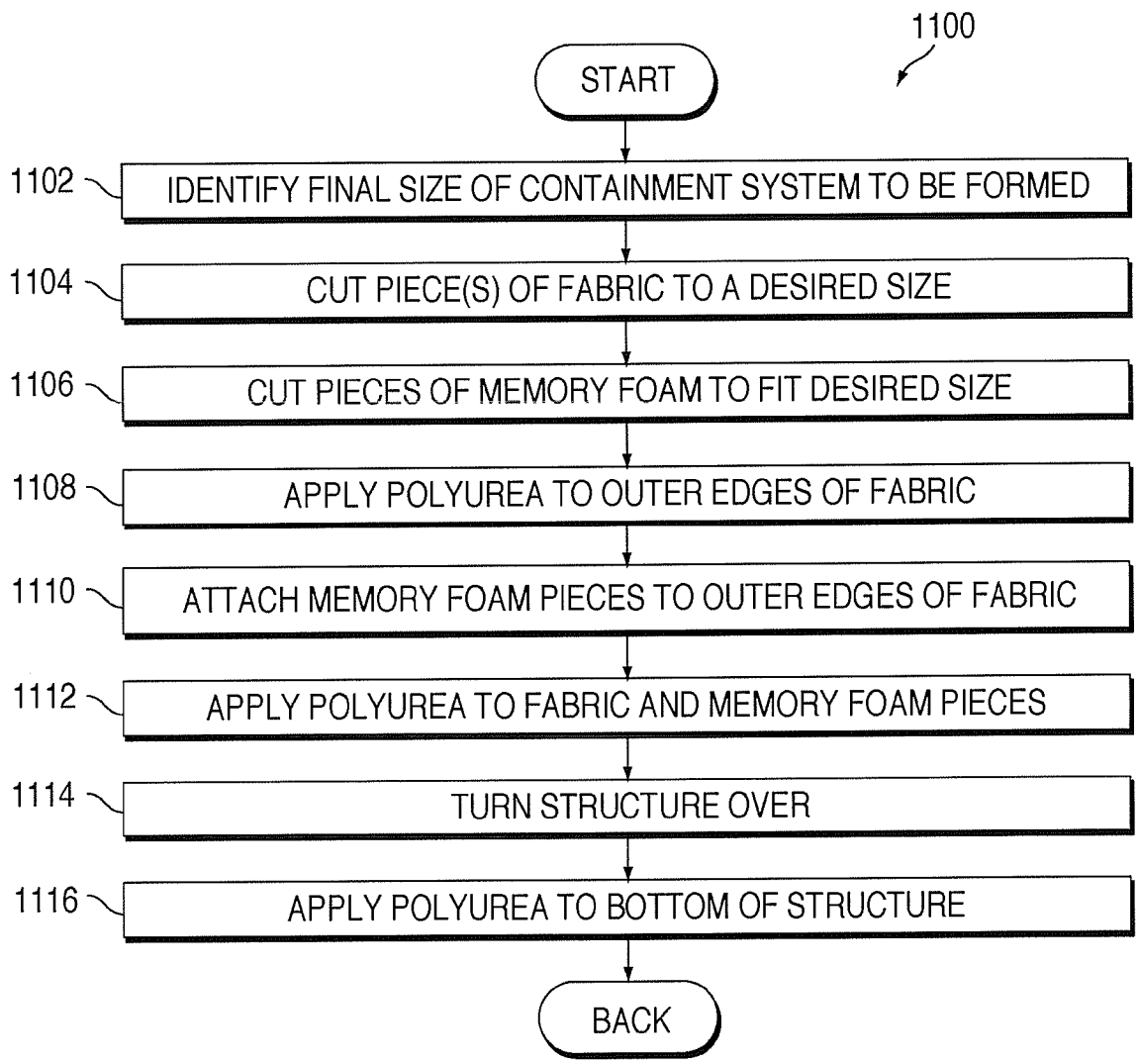
FIG. 11 illustrates an example method for forming the portable containment system of FIGS. 8 through 10 according to this disclosure.

FIG. 11 illustrates an example method 1100 for forming the portable containment system of FIGS. 8 through 10 according to this disclosure. As shown in FIG. 11, a desired final size of the containment system is identified at step 1102. One or more pieces of felt or other fabric are cut to a desired size at step 1104. Each fabric piece could have any suitable size and shape, such as a rectangle four feet by twelve feet. One or multiple pieces of fabric could be used here.

One or more pieces of memory foam are cut to fit the desired size at step 1106. The memory foam could be cut so that one or more pieces fit along the outer edges of the fabric piece(s). The memory foam pieces define where the walls 804 are being formed.

Polyurea is applied to the outer edges of the fabric at step 1108, and the memory foam pieces are attached to the outer edges of the fabric at step 1110. The memory foam pieces are therefore attached to the outer edges of the fabric when the polyurea cures.

Polyurea is applied onto the fabric and memory foam pieces at step 1112. The containment structure is turned over at step 1114, and polyurea is applied to the bottom of the structure at step 1116. Any suitable amount of polyurea can be applied to the walls 804 and floor 802 of the containment system 800. Once completed, the containment system can be used in any suitable manner.

Although FIG. 11 illustrates one example of a method 1100 for forming the portable containment system of FIGS. 8 through 10, various changes may be made to FIG. 11. For example, while shown as a series of steps, various steps in FIG. 11 could overlap, occur in parallel, or occur in a different order. Also, while the use of certain materials (such as polyurea, felt, and memory foam) is described here, any other suitable materials can be used to form the containment system. In addition, note that spraying represents one way of depositing a liquid-impervious material onto a structure and that other deposition techniques could be used.

Figure 12:
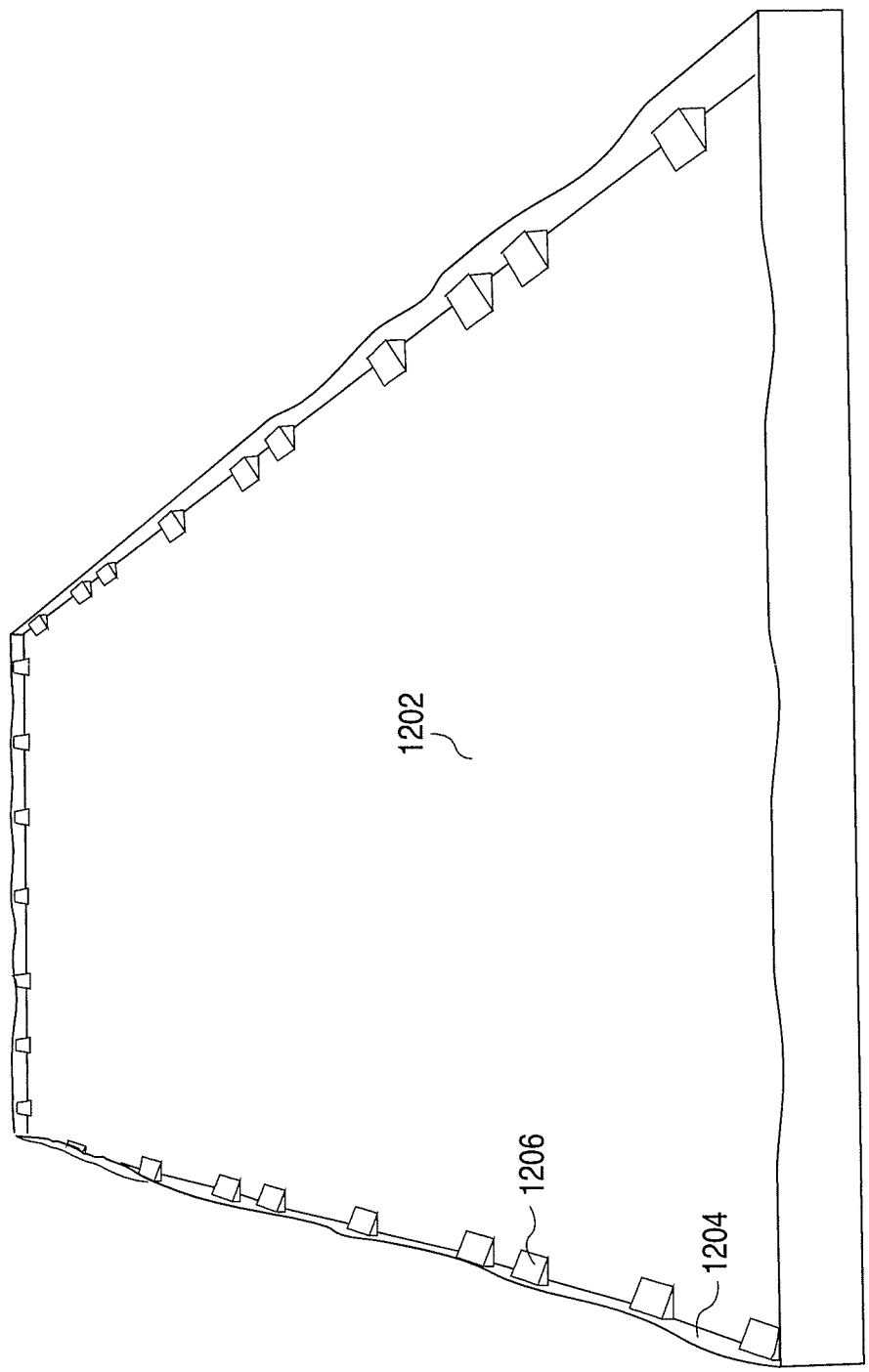
FIG. 12 illustrates a third example portable containment system in accordance with this disclosure.

FIG. 12 illustrates a third example portable containment system 1200 in accordance with this disclosure. As shown in FIG. 12, the containment system 1200 includes a floor 1202 and walls 1204. The floor 1202 can be formed using felt or other fabric(s), and the floor 1202 and the walls 1204 can be formed using polyurea or other liquid-impervious material(s). These structures could be formed in the same or similar manner as in the containment system 100 described above.

The containment system 1200 also includes multiple supports 1206 attached to the walls 1204 and floor 1202. The supports 1206 can be formed using memory foam material or other type of shape memory material(s). These structures could be formed in the same or similar manner as in the containment system 800 described above, except the shape memory material in the supports 1206 is not continuous around the entire containment system 1200. The walls 1204 and supports 1206 here can be deformed during use and may return substantially to their pre-flexed shape (although some deformation of a wall 1204 or support 1206 is permissible).

Although FIG. 12 illustrates a third example of a portable containment system 1200, various changes may be made to FIG. 12. For example, the containment system 1200 could have any suitable size, shape, and dimensions. As particular examples, the containment system 1200 could be of virtually any size as long as there is enough space to create walls for containing material meant to be contained. Also, the shape could be typically square or rectangular, although circular or other shapes could also be used. Further, the walls 1204 could have any suitable height(s), and non-uniform heights are also possible. Moreover, the supports 1206 could have any suitable size and shape, and any number of supports 1206 could be used. In addition, while the use of certain materials (such as polyurea, felt, and memory foam) is described here, any other suitable materials can be used to form the containment system 1200. For instance, any suitable textiles or other fabrics could be used in the containment system 1200 and covered with polyurea or other liquid-impervious material(s). Beyond that, any suitable shape-memory material(s) could be used in the supports 1206 of the containment system 1200.

Figure 13:
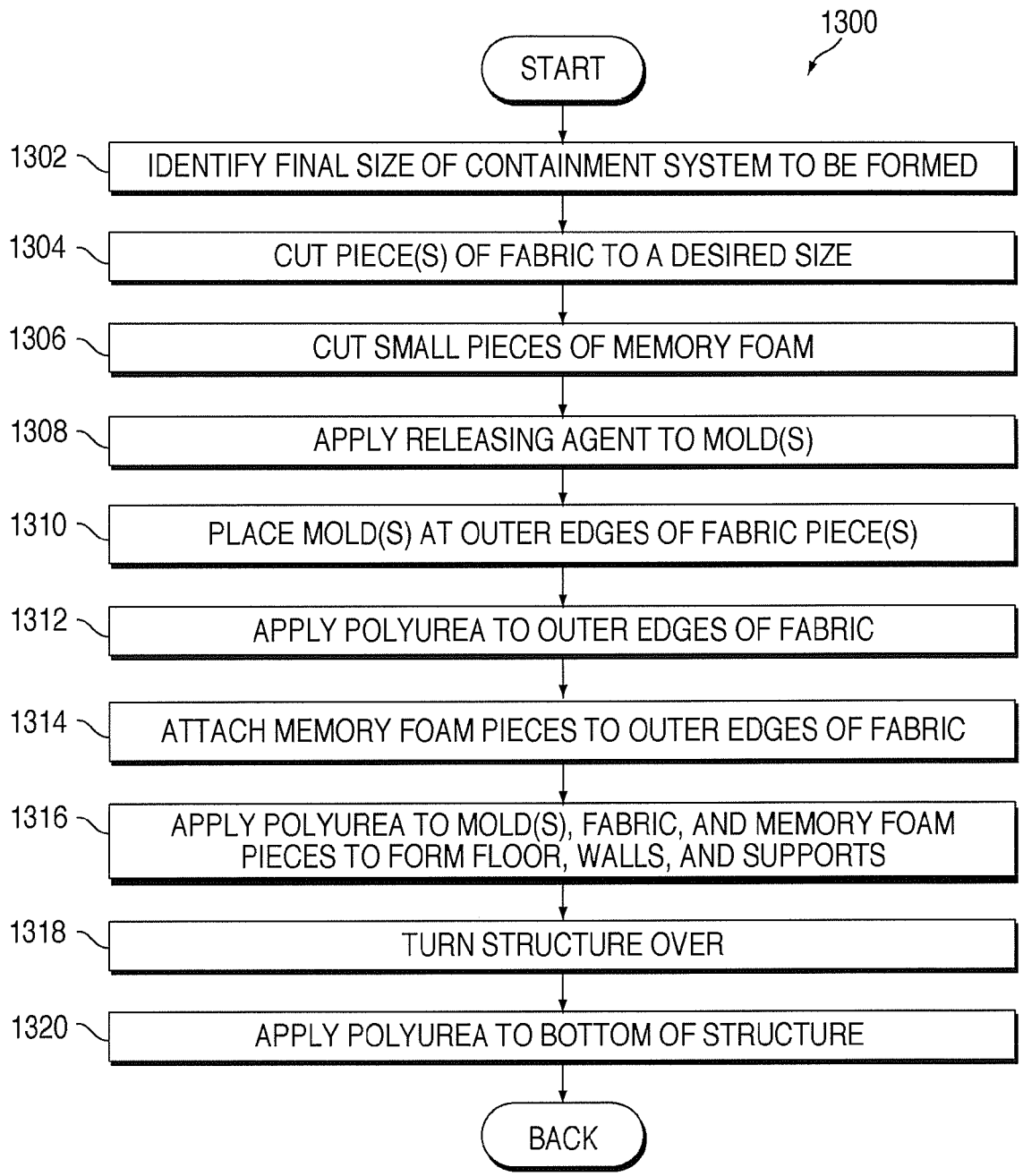
FIG. 13 illustrates an example method for forming the portable containment system of FIG. 12 according to this disclosure.

FIG. 13 illustrates an example method 1300 for forming the portable containment system of FIG. 12 according to this disclosure. As shown in FIG. 13, a desired final size of the containment system is identified at step 1302. One or more pieces of felt or other fabric are cut to a desired size at step 1304. Each fabric piece could have any suitable size and shape, such as a rectangle four feet by twelve feet. One or multiple pieces of fabric could be used here. Multiple pieces of memory foam are cut at step 1306. The memory foam could be cut so that the supports 1206 have any suitable size and shape, such as triangular wedges.

A releasing agent is applied to one or more molds at step 1308. The releasing agent could represent any suitable material(s) to help prevent bonding of the containment system 1200 to the mold(s), such as a polyurea releasing agent. The molds are placed along outer edges of the fabric piece(s) at step 1310. If the molds are L-shaped, this step could include placing outer edges of the fabric pieces on the bottom portions of the molds.

Polyurea is applied to the outer edges of the fabric at step 1312, and the memory foam pieces are attached to the outer edges of the fabric at step 1314. The memory foam pieces are therefore attached to the outer edges of the fabric when the polyurea cures.

Polyurea is applied to the mold(s), fabric, and memory foam pieces and cured to form the floor, walls, and supports of the containment system at step 1316. This could include, for example, spraying polyurea onto the molds, fabric pieces, and memory foam pieces and allowing the polyurea to cure. Any suitable amount of polyurea can be applied to the floor 1202, walls 1204, and supports 1206 of the containment system 1200.

The containment structure is turned over at step 1318, and polyurea is applied to the bottom of the structure at step 1320. The polyurea used here could represent a light application of polyurea meant to protect the underside of the structure. Once completed, the containment system can be used in any suitable manner.

Although FIG. 13 illustrates one example of a method 1300 for forming the portable containment system 1200 of FIG. 12, various changes may be made to FIG. 13. For example, while shown as a series of steps, various steps in FIG. 13 could overlap, occur in parallel, or occur in a different order. Also, while the use of certain materials (such as polyurea, felt, and memory foam) is described here, any other suitable materials can be used to form the containment system. In addition, note that spraying represents one way of depositing a liquid-impervious material onto a structure and that other deposition techniques could be used.

Figure 14:
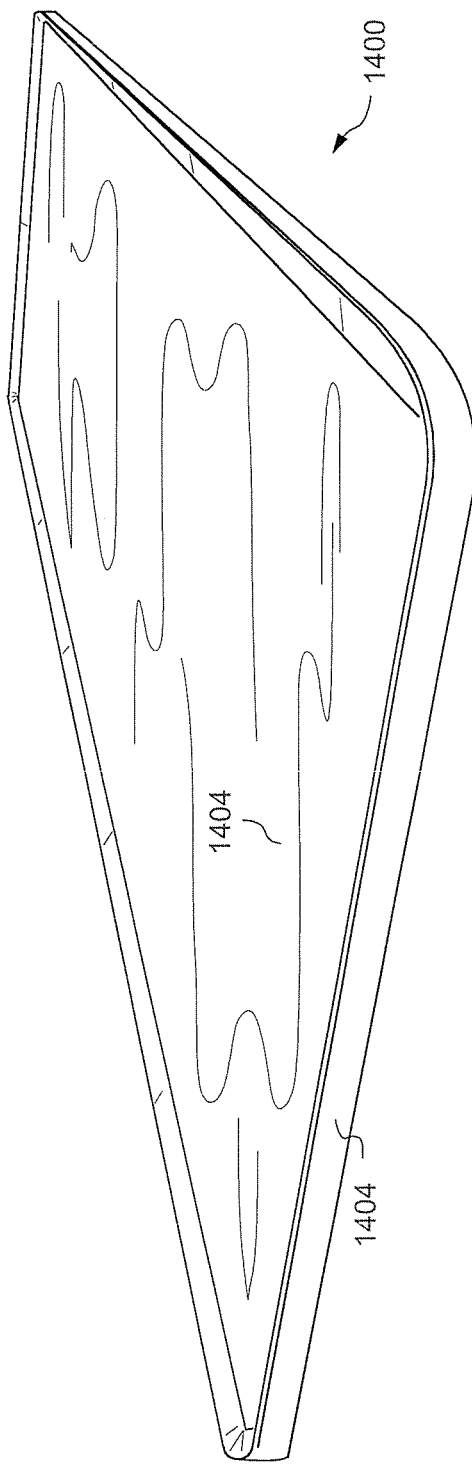
FIGS. 14 and 15 illustrate a fourth example portable containment system in accordance with this disclosure.
Figure 15:
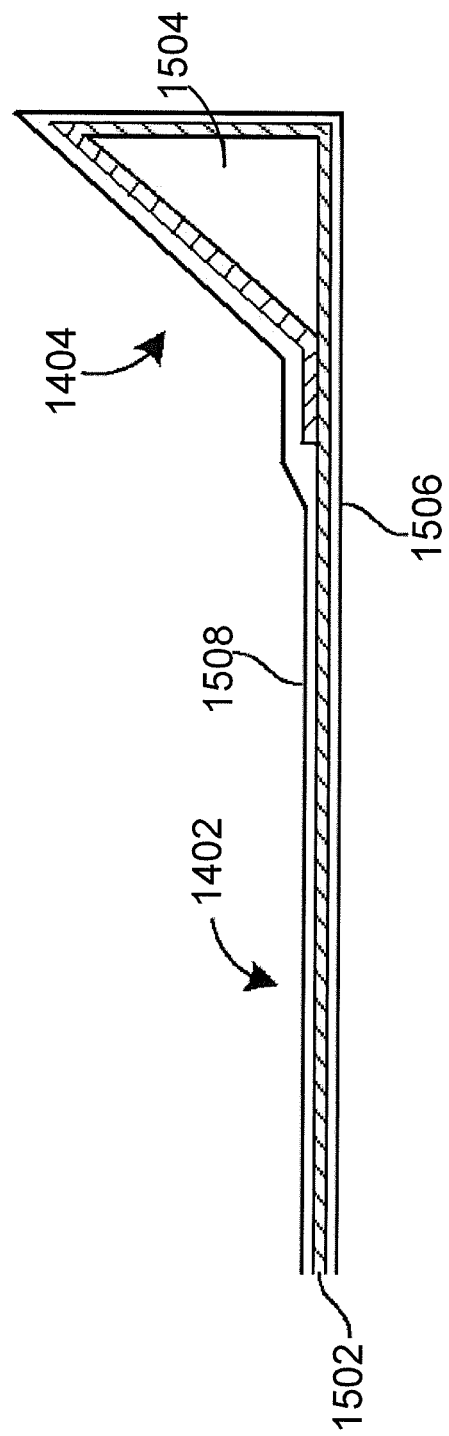

FIGS. 14 and 15 illustrate a fourth example portable containment system 1400 in accordance with this disclosure. In FIG. 14, the portable containment system 1400 has the same general structure as the portable containment system 800 shown in FIG. 8. The portable containment system 1400 includes a bottom portion or floor 1402 and free-standing walls 1404. The containment system 1400 operates to contain and hold material between the walls 1404 and over the floor 1402, thereby helping to prevent the material from being absorbed into the ground. In some embodiments, the containment system 1400 is a seamless structure formed from polyurea, felt, and memory foam. However, the containment system 1400 could be formed from any other suitable materials. Also, the containment system 1400 can be used to hold and prevent release of any hazardous and nonhazardous material(s). In addition, the walls 1404 could have any suitable cross-sectional shape.

As shown in FIG. 15, the wall 1404 of the containment system 1400 could be formed using felt 1502 and memory foam material 1504 (or other shape memory material). The felt 1502 and memory foam material 1504 can be covered by layers 1506-1508 of polyurea to create a liquid-impervious structure. Once again, note that the memory foam material 1504 could have any other desired shape, and any other material(s) could be used in place of the felt 1502.

Unlike the approach shown in FIG. 10, the felt 1502 here wraps around the memory foam material 1504. The bottom of the memory foam material 1504 can be attached to the felt 1502, such as by using polyurea, at a location that is spaced some distance from the edge of the felt 1502. The felt 1502 could then be wrapped up and over the memory foam material 1504, possibly while being attached to the sides of the memory foam material 1504 (such as with polyurea). Finally, the outer edge of the felt 1502 can be secured to another portion of the felt 1502, such as by using polyurea, before the top surface of the structure is covered in the layer 1508 of polyurea. Effectively, the memory foam material 1504 is wrapped in and possibly attached to the felt 1502.

The containment system 1400 here is flexible and can be rolled or otherwise placed into a suitable form for transport (similar to that shown above). Once at its intended destination, the containment system 1400 can be placed on the ground and unrolled or otherwise placed into a suitable form for use, and equipment (such as one or more storage tanks) can be placed on the containment system 1400. When the equipment is being placed onto the containment system 1400, people or machinery can be used to drag or carry the equipment onto the containment system 1400. The walls 1404 of the containment system 1400 can be depressed, and the walls 1404 may return substantially to their pre-depressed shape (although some deformation of a wall 1404 is permissible). This helps to facilitate easier placement of the equipment on the containment system 1400.

Note that the containment system 1400 again does not require the use of metallic or other solid supports to hold the walls 1404 of the containment system 1400 upright. This can provide various advantages, such as those discussed above.

Although FIGS. 14 and 15 illustrate a fourth example of a portable containment system 1400, various changes may be made to FIGS. 14 and 15. For example, the containment system 1400 could have any suitable size, shape, and dimensions. As particular examples, the containment system 1400 could be of virtually any size as long as there is enough space to create walls for containing material meant to be contained. Also, the shape could be typically square or rectangular, although circular or other shapes could also be used. Further, the walls 1404 could have any suitable height(s), and non-uniform heights are also possible. In addition, while the use of certain materials (such as polyurea, felt, and memory foam) is described here, any other suitable materials can be used to form the containment system 1400. For instance, any suitable textiles or other fabrics could be used in the containment system 1400 and covered with polyurea or other liquid-impervious material(s). Moreover, any suitable shape-memory material(s) could be used in the walls 1404 of the containment system 1400.

Figure 16:
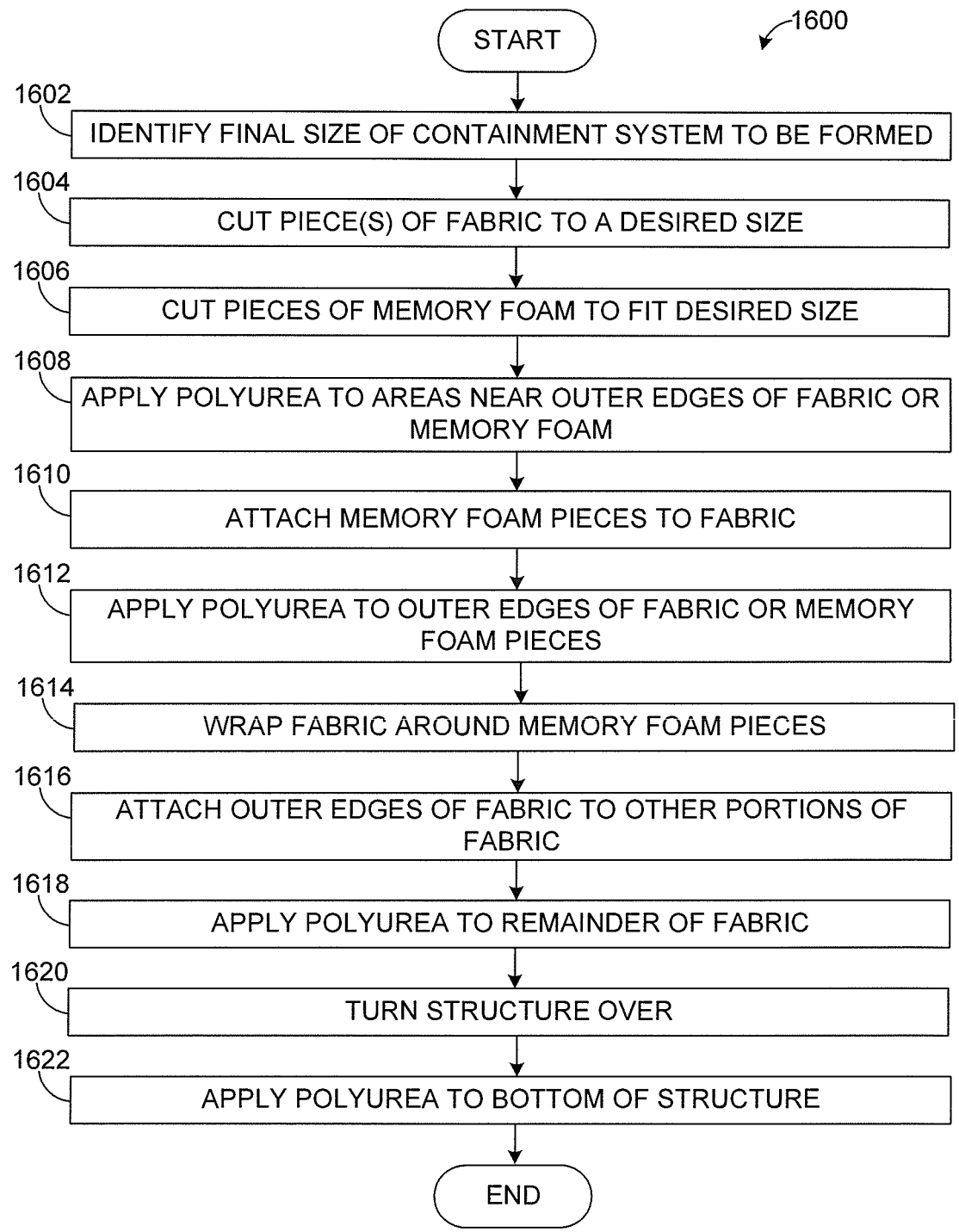
FIG. 16 illustrates an example method for forming the portable containment system of FIGS. 14 and 15 according to this disclosure.

FIG. 16 illustrates an example method 1600 for forming the portable containment system of FIGS. 14 and 15 according to this disclosure. As shown in FIG. 16, a desired final size of the containment system is identified at step 1602. One or more pieces of felt or other fabric are cut to a desired size at step 1604. Each fabric piece could have any suitable size and shape, such as a rectangle four feet by twelve feet. One or multiple pieces of fabric could be used here. One or more pieces of memory foam are cut to fit the desired size at step 1606. The memory foam could be cut so that one or more pieces fit close to (but are spaced some distance apart from) the outer edges of the fabric piece(s). The memory foam pieces define where the walls 1404 are being formed.

Polyurea is applied near the outer edges of the fabric and/or the memory foam pieces at step 1608, and the memory foam pieces are attached to the fabric at step 1610. The memory foam pieces are therefore attached close to (but spaced apart from) the outer edges of the fabric when the polyurea cures. Polyurea is applied onto the outer edges of the fabric or the memory foam pieces at step 1612, and the fabric is wrapped around the memory foam pieces at step 1614. This wraps the fabric around the memory foam pieces. Note, however, that a side of the memory foam piece(s) could also be secured to the fabric along the outer edge, and the memory foam piece(s) could then be rolled to wrap the memory foam piece(s) in fabric. As a result, any suitable technique for wrapping a memory foam piece in fabric could be used here.

The outer edges of the fabric are attached to other portions of the fabric at step 1616. This could include, for example, using the polyurea along the outer edges of the fabric to attach the outer edges of the fabric to other areas of the fabric. Polyurea is applied onto the remainder of the fabric at step 1618. The containment structure is turned over at step 1620, and polyurea is applied to the bottom of the structure at step 1622. Any suitable amount of polyurea can be applied to the walls 1404 and floor 1402 of the containment system 1400. Once completed, the containment system 1400 can be used in any suitable manner.

Although FIG. 16 illustrates one example of a method 1600 for forming the portable containment system of FIGS. 14 and 15, various changes may be made to FIG. 16. For example, while shown as a series of steps, various steps in FIG. 16 could overlap, occur in parallel, or occur in a different order. Also, while the use of certain materials (such as polyurea, felt, and memory foam) is described here, any other suitable materials can be used to form the containment system. In addition, note that spraying represents one way of depositing a liquid-impervious material onto a structure and that other deposition techniques could be used.

Figure 17:
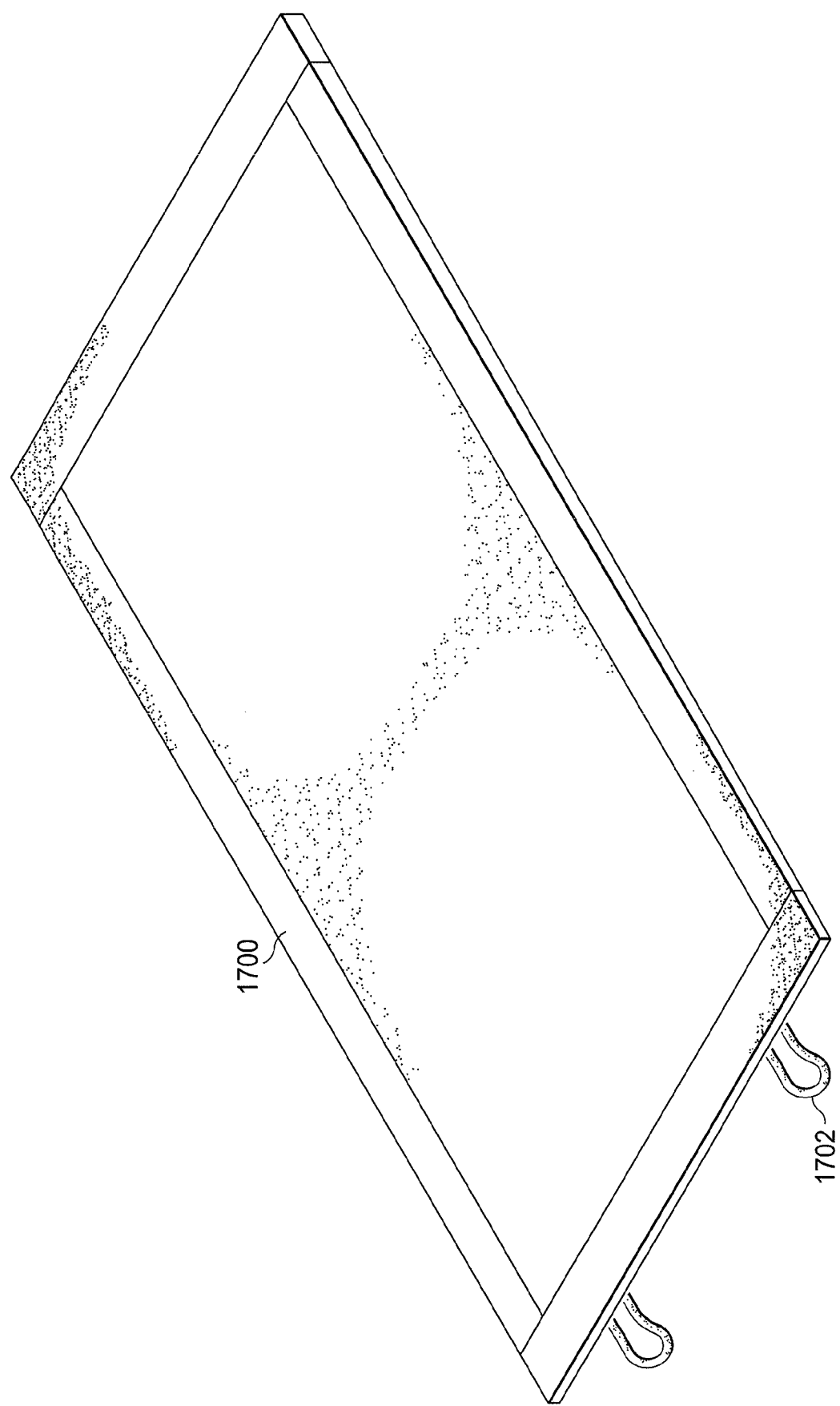
FIG. 17 illustrates example handles integrated into a portable containment system according to this disclosure.

FIG. 17 illustrates example handles integrated into a portable containment system 1700 according to this disclosure. In this example, two handles 1702 are integrated into the portable containment system 1700. The handles 1702 can be used to maneuver the portable containment system 1700.

In some embodiments, the handles 1702 could be formed by cutting relief slits in the flooring of the portable containment system 1700 and bringing the handles 1702 to the perimeter of the portable containment system 1700. At that point, the handles 1702 are allowed to hang free from the portable containment system 1700. The structure is then sprayed with polyurea to attach the handles to the floor of the portable containment system 1700.

In other embodiments, the handles 1702 can be formed along the walls or floor of the containment system 1700 using a "cut and weave" design to attach the handles to the felt pieces. The structure is then sprayed with polyurea to seal the handles 1702 to the structure.

Although FIG. 17 illustrates one example of handles 1702 integrated into a portable containment system 1700, various changes may be made to FIG. 17. For example, while the portable containment system 1700 appears to have continuous walls formed using memory foam material, any of the portable containment systems described above could include handles 1702 formed in the same or similar manner. Also, while the portable containment system 1700 is shown as having two handles along a shorter edge of the containment system, a portable containment system could include any number of handles in any suitable arrangement.

Note that the containment systems 100, 800, 1200, 1400, 1700 could include any other suitable features as desired depending on the implementation. For example, at one end of the containment system 100, 800, 1200, 1400, 1700, multiple tabs can be formed with holes or openings. As a particular example, multiple tabs formed by felt covered in polyurea can be placed at one end of the containment system 100, 800, 1200, 1400, 1700, such as tabs formed using one foot by two foot pieces of felt. The tabs could include oblong openings, such as openings of around one inch by five inches in size. A forklift operator can place the forklift's fingers into the openings of the tabs, allowing the forklift operator to raise and lower the containment system 100, 800, 1200, 1400, 1700 without requiring the forklift to physically touch the floor and walls of the containment system 100, 800, 1200, 1400, 1700. As another example, serial number tags, company logos, or other components can be attached to a containment system 100, 800, 1200, 1400, 1700 before, during, or after fabrication of the containment system 100, 800, 1200, 1400, 1700. Any other or additional features could be used in the containment system 100, 800, 1200, 1400, 1700.

It may be advantageous to set forth definitions of certain words and phrases that have been used within this patent document. The terms "include" and "comprise," as well as derivatives thereof, mean inclusion without limitation. The term "or" is inclusive, meaning and/or. The phrase "associated with" and derivatives thereof may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like.

While this disclosure has described certain embodiments and generally associated methods, alterations and permutations of these embodiments and methods will be apparent to those skilled in the art. Accordingly, the above description of example embodiments does not define or constrain this invention. Other changes, substitutions, and alterations are also possible without departing from the spirit and scope of this invention as defined by the following claims.

What is claimed is:

1. A method comprising:
   obtaining at least one piece of shape memory material, each piece of shape memory material having a cross-section defining multiple sides of the piece of shape memory material;
   attaching one or more of the sides of the at least one piece of shape memory material to one or more pieces of fabric;
   wrapping the one or more pieces of fabric around each piece of shape memory material so that the one or more pieces of fabric contact the multiple sides of each piece of shape memory material;
   attaching outer edges of the one or more pieces of fabric to other portions of the one or more pieces of fabric;
   depositing liquid-impervious material onto multiple sides of the one or more pieces of fabric to form free-standing flexible walls and a floor of a containment structure, the floor formed seamlessly with the walls; and forming multiple tabs located at one end of the containment structure, each tab comprising liquid-impervious material on one or more additional pieces of fabric, the tabs defining openings configured to receive fingers of a forklift;

wherein each individual piece of fabric that is wrapped around an associated piece of the shape memory material contacts all of the multiple sides of the associated piece of shape memory material such that the individual piece of fabric defines a space in which the associated piece of shape memory material is located.

2. The method of claim 1, wherein:

each piece of shape memory material is generally triangular with a bottom side and two other sides; and attaching one or more of the sides of each piece of shape memory material to the one or more pieces of fabric comprises attaching the bottom side of each piece of shape memory material to the one or more pieces of fabric inward of the outer edges of the one or more pieces of fabric.

3. The method of claim 2, wherein attaching the bottom side of each piece of shape memory material to the one or more pieces of fabric comprises:

attaching the bottom side of each piece of shape memory material to the one or more pieces of fabric using liquid-impervious material.

4. The method of claim 3, wherein wrapping the one or more pieces of fabric around each piece of shape memory material comprises:

attaching the two other sides of each piece of shape memory material to the one or more pieces of fabric using liquid-impervious material.

5. The method of claim 1, wherein attaching the outer edges of the one or more pieces of fabric to the other portions of the one or more pieces of fabric comprises:

attaching the outer edges of the one or more pieces of fabric to a top surface of the one or more pieces of fabric.

6. The method of claim 1, wherein attaching the outer edges of the one or more pieces of fabric to the other portions of the one or more pieces of fabric comprises:

attaching the outer edges of the one or more pieces of fabric to the other portions of the one or more pieces of fabric using liquid-impervious material.

7. The method of claim 1, wherein the free-standing flexible walls are configured to be repeatedly depressed and to return substantially to their pre-depressed shape.

8. The method of claim 1, further comprising:

rolling up the containment structure without removing any portion of the free-standing flexible walls.

9. The method of claim 1, wherein:

the one or more pieces of fabric comprise felt;

the liquid-impervious material comprises polyurea; and the at least one piece of shape memory material comprises at least one piece of memory foam.

10. The method of claim 1, further comprising:

forming one or more handles, each handle connected to the containment structure and sealed to the containment structure using liquid-impervious material.

11. A method comprising:

obtaining multiple pieces of shape memory foam, each piece of shape memory foam having a cross-section defining multiple sides of the piece of shape memory foam;

wrapping one or more pieces of fabric around each piece of shape memory foam so that the one or more pieces of fabric contact the multiple sides of each piece of shape memory foam, at least one of the sides of each piece of shape memory foam attached to the one or more pieces of fabric inward from outer edges of the one or more pieces of fabric using liquid-impervious material;

attaching the outer edges of the one or more pieces of fabric to top surfaces of other portions of the one or more pieces of fabric using liquid-impervious material;

depositing liquid-impervious material onto multiple sides of the one or more pieces of fabric to form free-standing flexible walls and a floor of a containment structure, the floor formed seamlessly with the walls; and forming multiple tabs located at one end of the containment structure, each tab comprising liquid-impervious material on one or more additional pieces of fabric, the tabs defining openings configured to receive fingers of a forklift;

wherein each individual piece of fabric that is wrapped around an associated piece of the shape memory foam contacts all of the multiple sides of the associated piece of shape memory foam such that the individual piece of fabric defines a space in which the associated piece of shape memory foam is located.

12. The method of claim 11, wherein:

the one or more pieces of fabric comprise felt; and the liquid-impervious material comprises polyurea.

13. A method comprising:

obtaining multiple pieces of shape memory material, each piece of shape memory material having a cross-section defining at least three sides of the piece of shape memory material;

wrapping one or more pieces of fabric around each piece of shape memory material so that the one or more pieces of fabric contact the at least three sides of each piece of shape memory material, at least one of the sides of each piece of shape memory material attached to the one or more pieces of fabric inward from outer edges of the one or more pieces of fabric using liquid-impervious material;

attaching the outer edges of the one or more pieces of fabric to top surfaces of other portions of the one or more pieces of fabric using liquid-impervious material;

depositing liquid-impervious material onto the one or more pieces of fabric to form free-standing flexible walls and a floor of a containment structure, the floor formed seamlessly with the walls; and forming multiple tabs located at one end of the containment structure, each tab comprising liquid-impervious material on one or more additional pieces of fabric, the tabs defining openings configured to receive fingers of a forklift;

wherein each individual piece of fabric that is wrapped around an associated piece of the shape memory material contacts all of the at least three sides of the associated piece of shape memory material such that the individual piece of fabric defines a space in which the associated piece of shape memory material is located.

14. The method of claim 13, wherein:

the one or more pieces of fabric comprise felt;

the liquid-impervious material comprises polyurea; and the multiple pieces of shape memory material comprise multiple pieces of memory foam.

15. The method of claim 13, wherein:

each piece of shape memory material is generally triangular with a bottom side and two other sides; and wrapping the one or more pieces of fabric around each piece of shape memory material comprises attaching the bottom side of each piece of shape memory material to the one or more pieces of fabric inward of the outer edges of the one or more pieces of fabric.

16. The method of claim 15, wherein attaching the bottom side of each piece of shape memory material to the one or more pieces of fabric comprises:
attaching the bottom side of each piece of shape memory material to the one or more pieces of fabric using liquid-impervious material.

17. The method of claim 15, wherein wrapping the one or more pieces of fabric around each piece of shape memory material comprises:
attaching the two other sides of each piece of shape memory material to the one or more pieces of fabric using liquid-impervious material.

18. The method of claim 13, wherein the free-standing flexible walls are configured to be repeatedly depressed and to return substantially to their pre-depressed shape.

19. The method of claim 13, further comprising:
rolling up the containment structure without removing any portion of the free-standing flexible walls.

20. The method of claim 13, further comprising:
forming one or more handles, each handle connected to the containment structure and sealed to the containment structure using liquid-impervious material.

* * * * *